United States Patent

Heckman

[19]

[11] Patent Number: 5,544,531
[45] Date of Patent: Aug. 13, 1996

[54] FLOWMETER HAVING ACTIVE TEMPERATURE COMPENSATION

[75] Inventor: Donald B. Heckman, Purcellville, Va.

[73] Assignee: Marsh-McBirney, Inc., Frederick, Md.

[21] Appl. No.: 370,246

[22] Filed: Jan. 9, 1995

[51] Int. Cl.[6] .................................................... G01F 15/02
[52] U.S. Cl. .................................... 73/861.01; 73/861
[58] Field of Search ............................ 73/861.01, 861.02, 73/861.03, 202.5, 204.119

[56] References Cited

U.S. PATENT DOCUMENTS

| | | | |
|---|---|---|---|
| 4,056,717 | 11/1977 | Cornforth | 73/861.03 |
| 4,083,246 | 4/1978 | Marsh . | |
| 4,475,407 | 10/1984 | Kruncos | 73/861.01 |
| 4,668,102 | 5/1987 | Mott | 73/861.02 |
| 4,715,003 | 12/1987 | Keller et al. . | |
| 4,765,188 | 8/1988 | Krechmery et al. . | |
| 5,237,523 | 8/1993 | Bonne et al. | 73/861.02 |
| 5,253,532 | 10/1993 | Kamens . | |

OTHER PUBLICATIONS

Brysek et al, "Silicon Sensors and Microstructures," Sep. 1991.
"Temperature Compensation IC Pressure Sensors", IC Sensors, Mar. 1985.
Tasker, Richard E., "What Transducer Performance Specs Really Mean" Sensors Nov. 1988.

*Primary Examiner*—Richard Chilcot
*Assistant Examiner*—Max Noori
*Attorney, Agent, or Firm*—Laubscher & Laubscher

[57] ABSTRACT

A method and apparatus for measuring fluid flow is characterized by compensating for temperature variations in the fluid level pressure transducer. The transducer is operated at a plurality of different combinations of pressure and temperature, and the drive and output voltages of the transducer are measured at each combination. A plurality of temperature coefficients are derived from the measured voltage and entered into a data logger for use in calculating flow.

13 Claims, 6 Drawing Sheets

FLOWMETER HAVING ACTIVE TEMPERATURE COMPENSATION

BACKGROUND OF THE INVENTION

Open channel flowmeters generally include a fluid velocity sensor and a liquid level sensor. The sensed velocity is converted to a mean velocity of the liquid flowing in a cross section of the pipe or conduit, and the level measurement provides an estimate of the cross sectional area through which the mean velocity flows. The volumetric flow rate is then computed as the product of cross sectional area and mean velocity.

Level sensors used in such flowmeters are generally piezoresistive pressure transducers which require substantial compensation to reduce errors in level measurements caused by temperature variations of the liquid. The present invention relates to a method and apparatus for compensating for temperature variations in the pressure transducer of an open channel flowmeter or in a flowmeter which measures only level and computes flow based on a known relationship such as the Manning equation.

BRIEF DESCRIPTION OF THE PRIOR ART

Conventional flowmeters use passive resistance temperature compensation techniques as described in an article entitled "Temperature Compensation IC Pressure Sensors," in IC Sensors, Inc. Application Note TN-002. Errors in level measurement basically include a zero level error term and a level span term. With resistance temperature compensation, practical error magnitudes are approximately 1% of full scale of the pressure transducer for both terms over a temperature range of from 5° to 45° C. Generally, the zero level error is not a linear function of temperature and may vary between extreme values over a temperature range that is considerably less than the compensated temperature range of the particular transducer. For a level sensor with a full scale range of 138 inches of water (5 psi full scale), the maximum zero level error could be as large as 1.4 inches. Such errors can result in unacceptably large volumetric flow estimates, particularly in small pipes less than 24 inches in diameter.

Other compensation techniques are known which utilize digital processing electronics as disclosed in Brysek et al, "Silicon Sensors and Microstructures." In these techniques, compensation coefficients are generated as a function of sensor drive and output voltages.

While the prior techniques improve the accuracy of the level measurement, they have not been used in connection with open channel flowmeters. The present invention was developed to improve the accuracy of fluid level measurements, thereby to improve the ultimate calculation of fluid flow.

SUMMARY OF INVENTION

Accordingly, it is a primary object of the present invention to provide an improved method and apparatus for measuring fluid flow including compensation for temperature variations in a pressure transducer used to measure fluid level for calculation of the cross sectional area of the fluid. The transducer is placed in a controlled environment and operated at a different combination of pressure and temperature. At each combination, the drive and output voltages of the transducer are measured. From these measured voltages a plurality of temperature/pressure coefficients are derived, the number of coefficients being less than or equal to the number of pressure and temperature combinations. The coefficients are entered into a data logger and processed with the pressure measurements of the transducer to provide an accurate calculation of the cross sectional area of the fluid. A velocity sensor is used to produce a mean velocity signal for the fluid. The calculated area and mean velocity signal are used to calculate the flow of the fluid.

According to a further object of the invention, the drive voltage can be measured either from input to the bridge of the pressure transducer or directly from the output of a temperature sensor.

According to another object of the invention, the coefficients are processed with a least means squares fit prior to entry in the data logger. The coefficients may be used to create standardized compensation values which are stored in lookup tables within a memory of the data logger.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
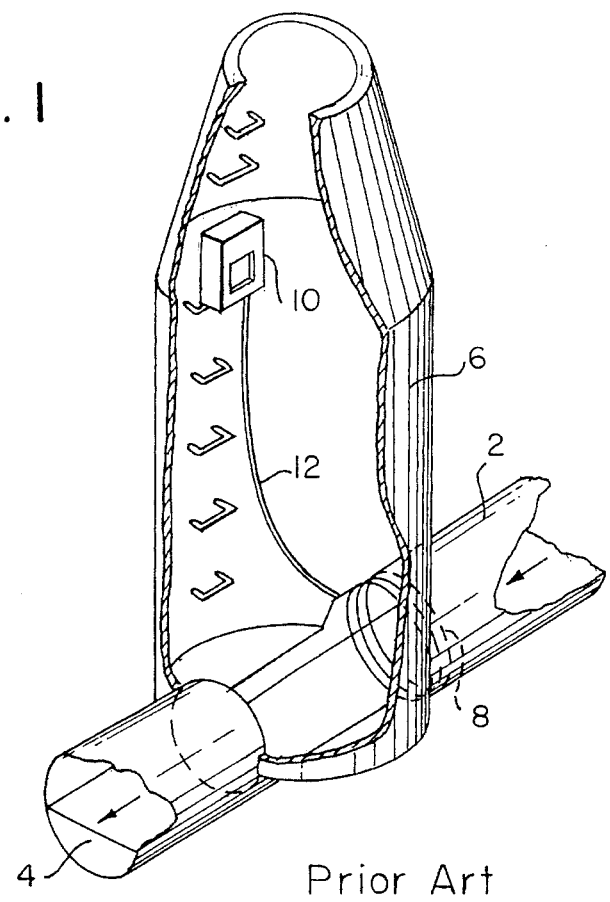
FIG. 1 is a cutaway perspective view of a flow channel having an open channel flowmeter mounted therein.

In FIG. 1 there is shown a conduit 2 having a fluid 4 flowing therethrough. Access to the conduit in provided via a manhole 6. Within the conduit is arranged a mounting band 8 for mounting a sensor (not shown) in the bottom of the conduit. As is known in the art, the sensor is submersed in the fluid and is capable of generating flow velocity and pressure signals which are transmitted to a data logger 10 via cable 12.

Figure 2:
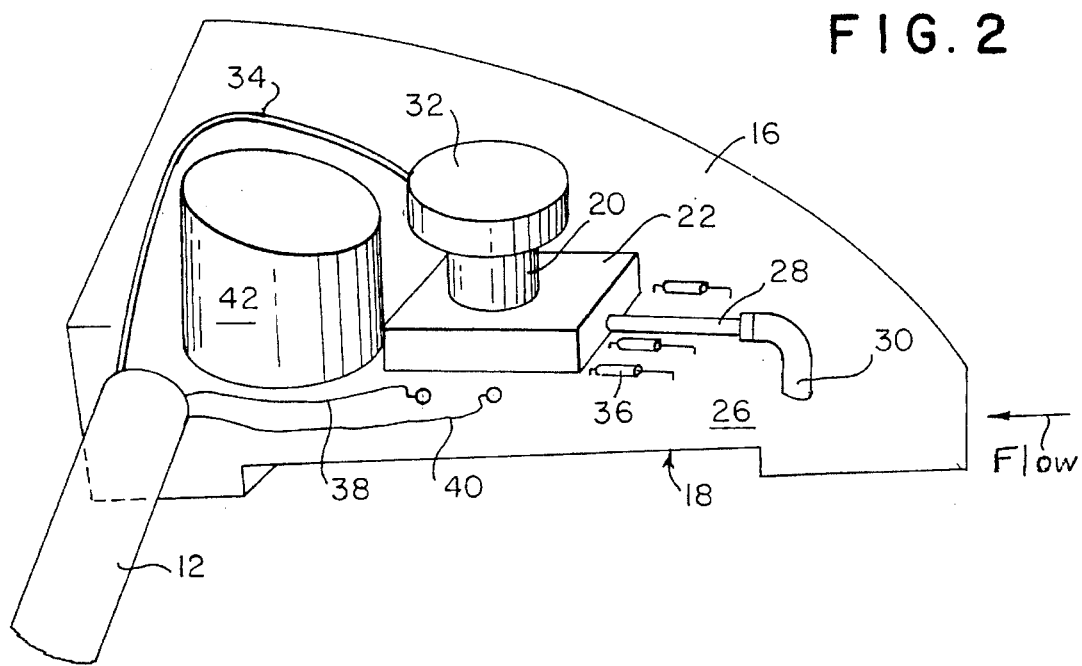
FIG. 2 is a cutaway view of a sensor used with the flowmeter of FIG. 1.

The sensor 16 will be described with reference to FIG. 2. Preferably, the sensor has a debris-shedding triangular configuration and is formed of a hard, non-corrosive material. The bottom of the sensor contains a recess 18 for receiving the mounting band 8 shown in FIG. 1. Within the sensor is mounted a pressure transducer 20 such as a NOVA sensor model NPH-8-030GR. The transducer is sealed in a base 22 through which the electrical leads 24 pass for connection with a printed wiring board 26. A pressure communication tube 28 is connected at one end with the transducer base 22. The other end of the tube terminates in a port 30 which is at the underside of the sensor and thus at the bottom of the fluid 4, so that the pressure of the fluid is communicated to the entry port of the transducer.

A cap 32 is sealed onto the top of the pressure transducer and communicates a reference pressure from a reference tube 34 to a top entry port of the transducer 20. The output voltage of the transducer is a differential voltage proportional to the difference in pressure between the top and bottom entry ports. The reference tube 34 is part of the cable 12 connecting the sensor to the data logger 10. Thus, the reference tube provides an atmospheric reference pressure to allow fluid level estimation in the presence of atmospheric pressure variations.

Temperature compensation resistors 36 mounted on the printed wiring board 26 are electrically connected with the pressure transducer 20. Drive current is supplied via wire pair 38 and the output voltage from the pressure transducer is conveyed to the data logger via wire pair 40. A flow velocity sensor 42, such as an electromagnetic or ultrasonic doppler sensor is provided to sense the mean velocity of the fluid in the conduit.

Figure 3:
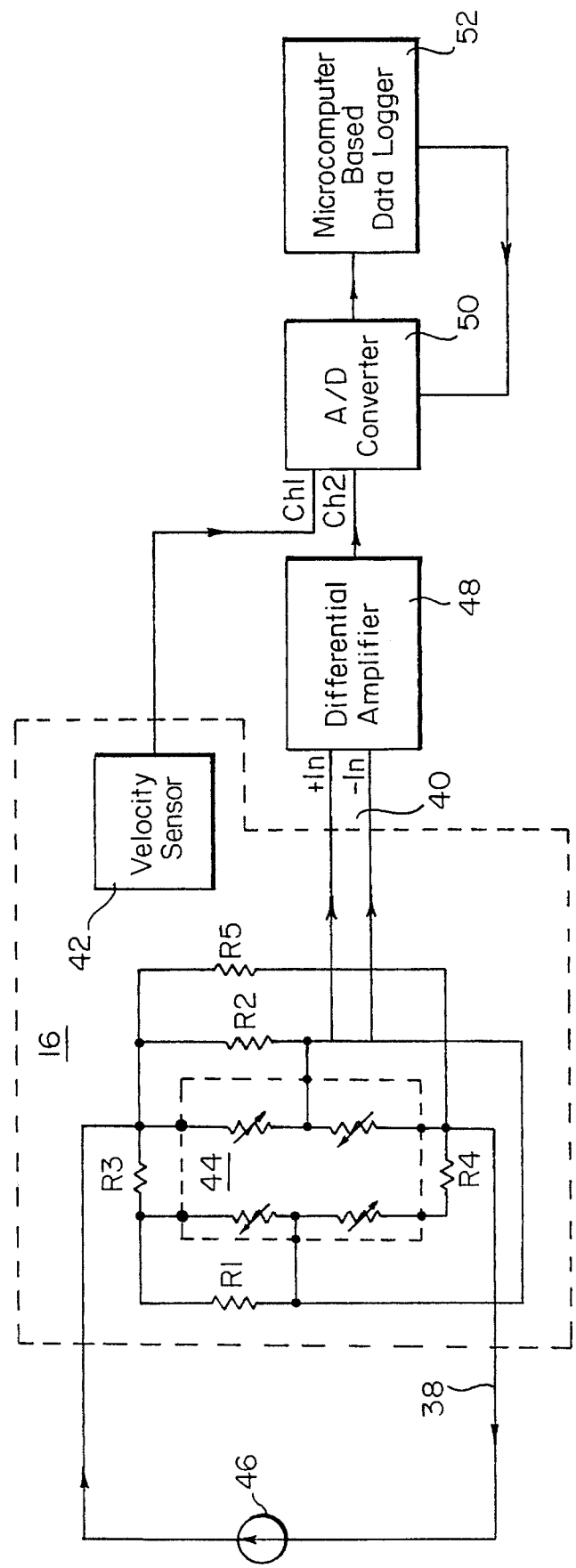
FIG. 3 is a schematic diagram of a pressure transducer having resistive temperature compensation according to the prior art.

Referring now to FIG. 3, there is shown an electrical circuit diagram of a pressure transducer within the sensor 16 and having resistance compensation as is know in the prior art. The pressure transducer includes a bridge 44 which is driven by a current source 46 via drive wire 38. Connected with the bridge 44 are compensation resistors R1, R2, R3, R4, and R5. Generally, only three compensation resistors are actually present. Either resistor R3 or R4 is present to compensate for bridge offset, the other being replaced with a conduction wire. Either resistor R1 or R2 is present to compensate for the temperature coefficient of offset, the other being omitted. Resistor R5 is used to compensate the temperature coefficient of gain to pressure input for a constant current drive.

The output from the pressure transducer bridge 44 is delivered to a differential amplifier 48 via output wires 40. The differential amplifier 48 removes the common mode voltage of the bridge and amplifies the relatively small difference voltage signals to levels suitable for processing by a multiplexed A/D converter 50. The A/D converter also receives a fluid velocity signal from the velocity sensor 42. The A/D converter converts analog voltage signal inputs from the bridge and the velocity sensor to digital signals suitable for processing by a data logger 52.

Figure 4:
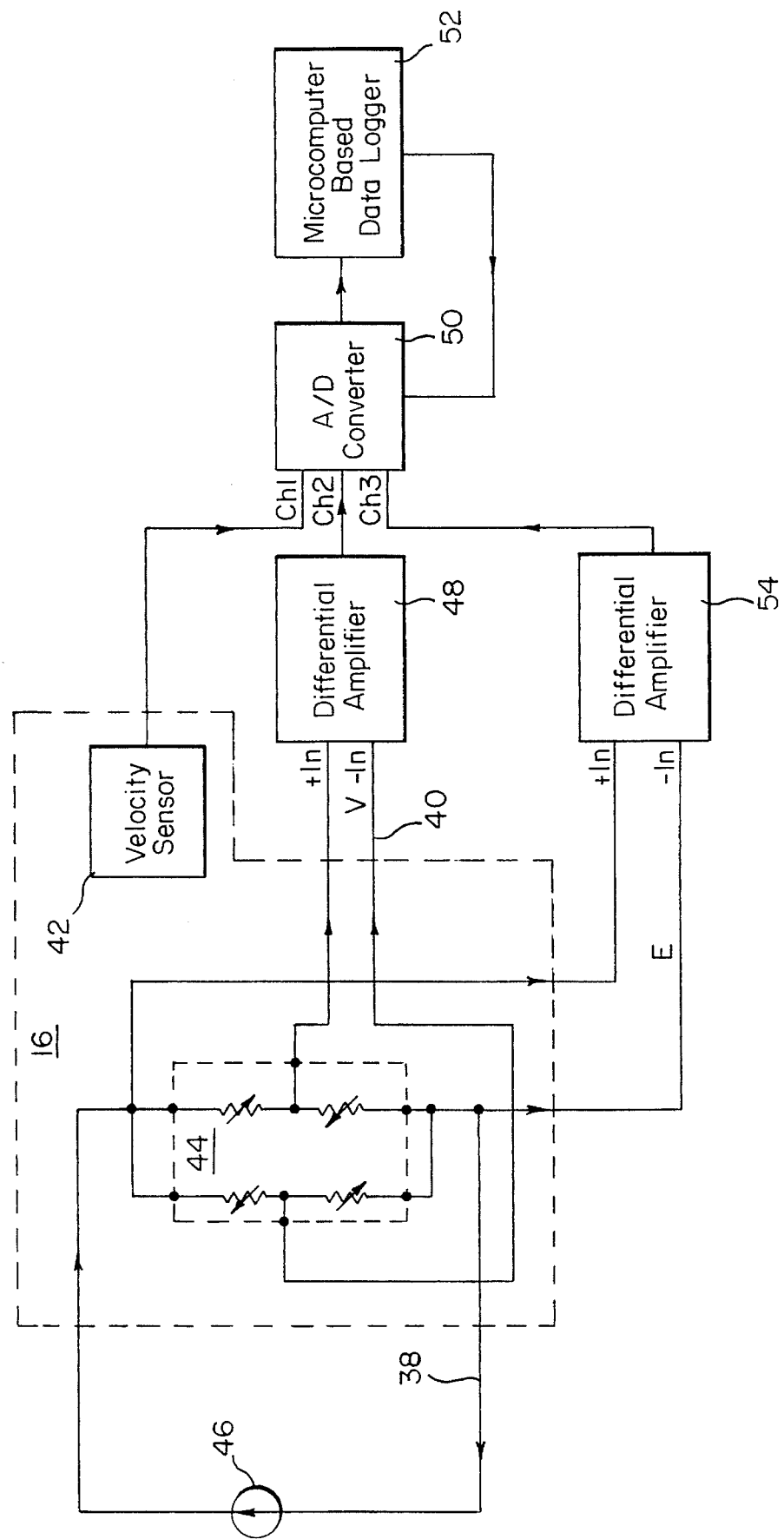
FIG. 4 is a schematic diagram of the temperature compensation of a pressure transducer according to a preferred embodiment of the invention.

The preferred embodiment of the invention is shown in FIG. 4. In lieu of the compensation resistors R1–R5 of FIG. 3, a second differential amplifier 54 is provided. As in the embodiment of FIG. 3, the first differential amplifier 48 receives a differential output voltage V from the pressure transducer bridge 44. The second differential amplifier 54 receives a drive voltage E from the bridge, i.e., the voltage across the bridge inputs as opposed to the differential voltage output V. The second differential amplifier is also connected with the A/D converter 50 which in turn is connected with a data logger 52 as in the embodiment of FIG. 3.

Figure 5:
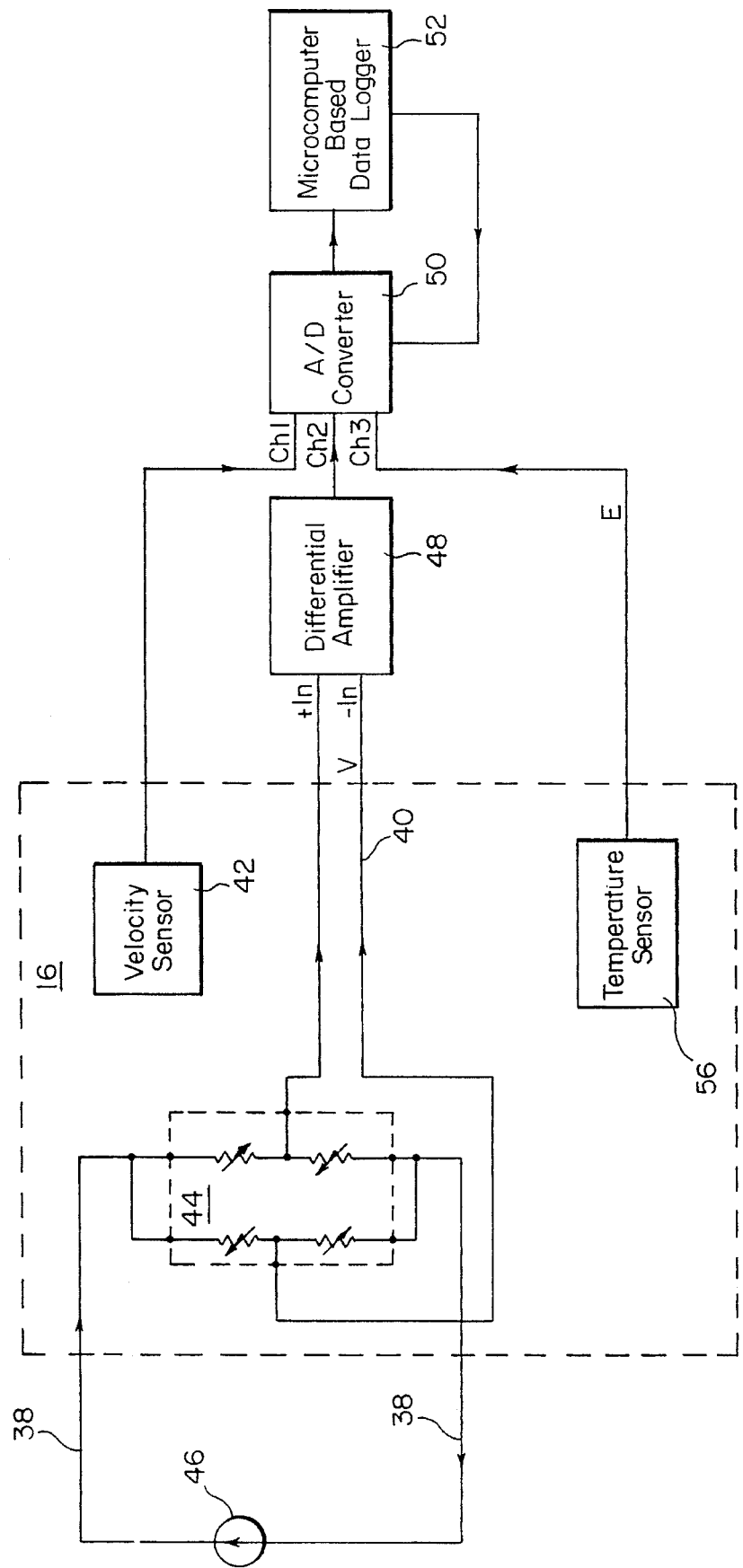
FIG. 5 is a schematic diagram of an alternate embodiment for temperature compensation of a pressure transducer.

In an alternate embodiment of FIG. 5, a temperature sensor 56 such as a thermister is provided in the flow sensor 16. This sensor produces a direct output signal corresponding to the drive voltage E. The signal E is delivered to the A/D converter 50 together with the differential output voltage signal V from the differential amplifier 48 and the velocity output signal from the velocity sensor 42. The output of the A/D converter is connected with the data logger 52.

Figure 6:
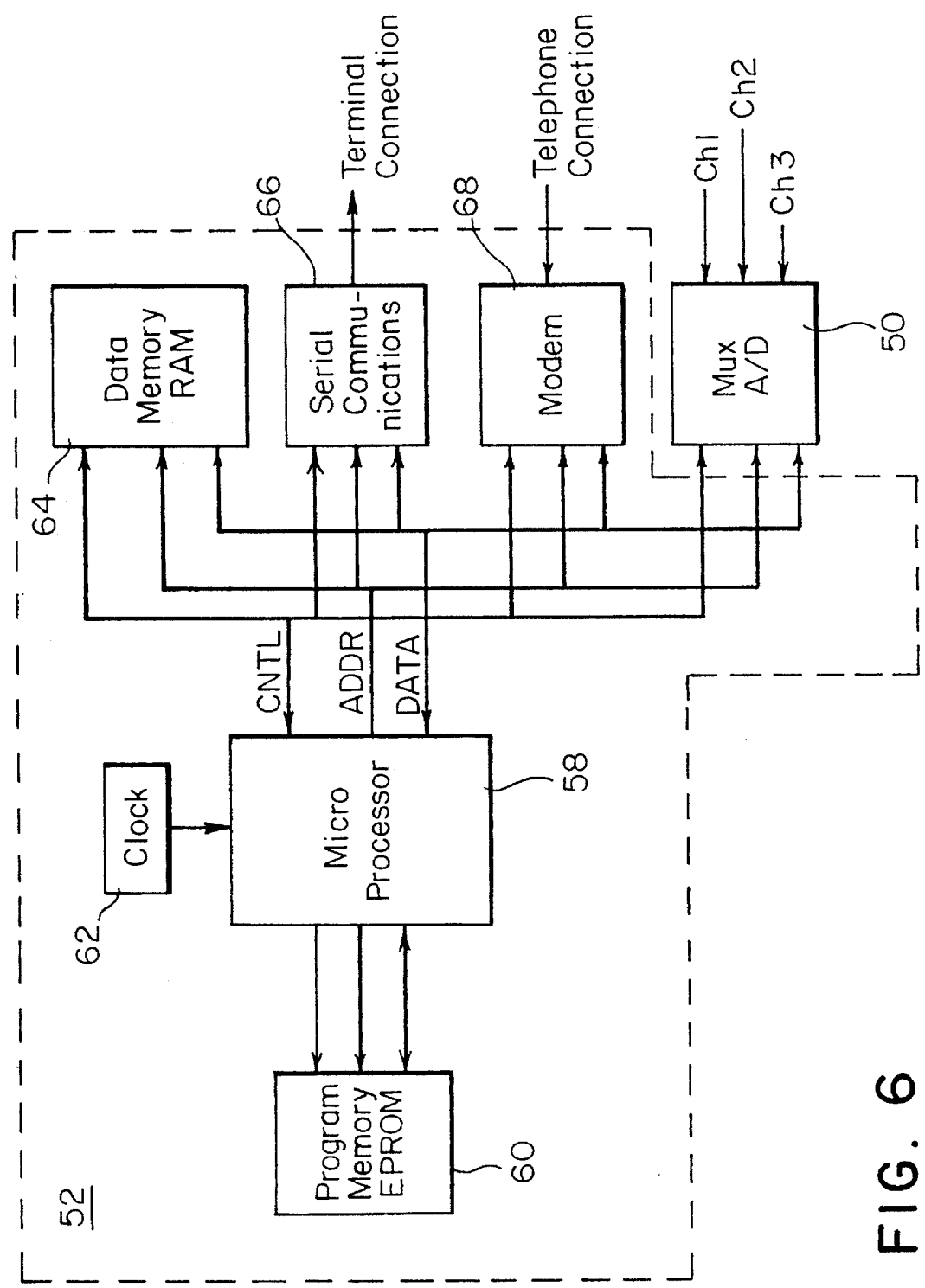
FIG. 6 is a block diagram of microcomputer and data logger according to the invention.

Referring now to FIG. 6, the data logger 52 will be described. It includes a microprocessor 58, an EPROM 60 which contains the program memory for the microprocessor. The data logger also includes a data memory RAM 64 for storing sensed values, a serial communication device 66 for connection with a terminal, and a modem 68 for connection with a telephone line. The microprocessor controls the operation of the system, performs the flow calculations, and enables the calculations to be read at a remote location via the modem.

The parabolic behavior of both pressure and temperature coefficients A, B of the pressure transducer are provided as shown in the following equation:

$$L = A_0 + A_1 V + A_2 V^2 \quad (1)$$

where L is the fluid level being measured. $A_0$, $A_1$, and $A_2$ are determined by the following equations $$A_0 = B_{00} + B_{01} E + B_{02} E^2 \quad (2)$$

$$A_1 = B_{10} + B_{11} E + B_{12} E^2 \quad (3)$$

$$A_2 = B_{20} + B_{21} E + B_{22} E^2 \quad (4)$$

By combining the above equations, the following equation is obtained;

$$L = B_{00} + B_{01} E + B_{02} E^2 + (B_{10} + B_{11} E + B_{12} E^2) V + (= B_{20} + B_{21} E + B_{22} E^2) V^2 \quad (5)$$

Figure 7:
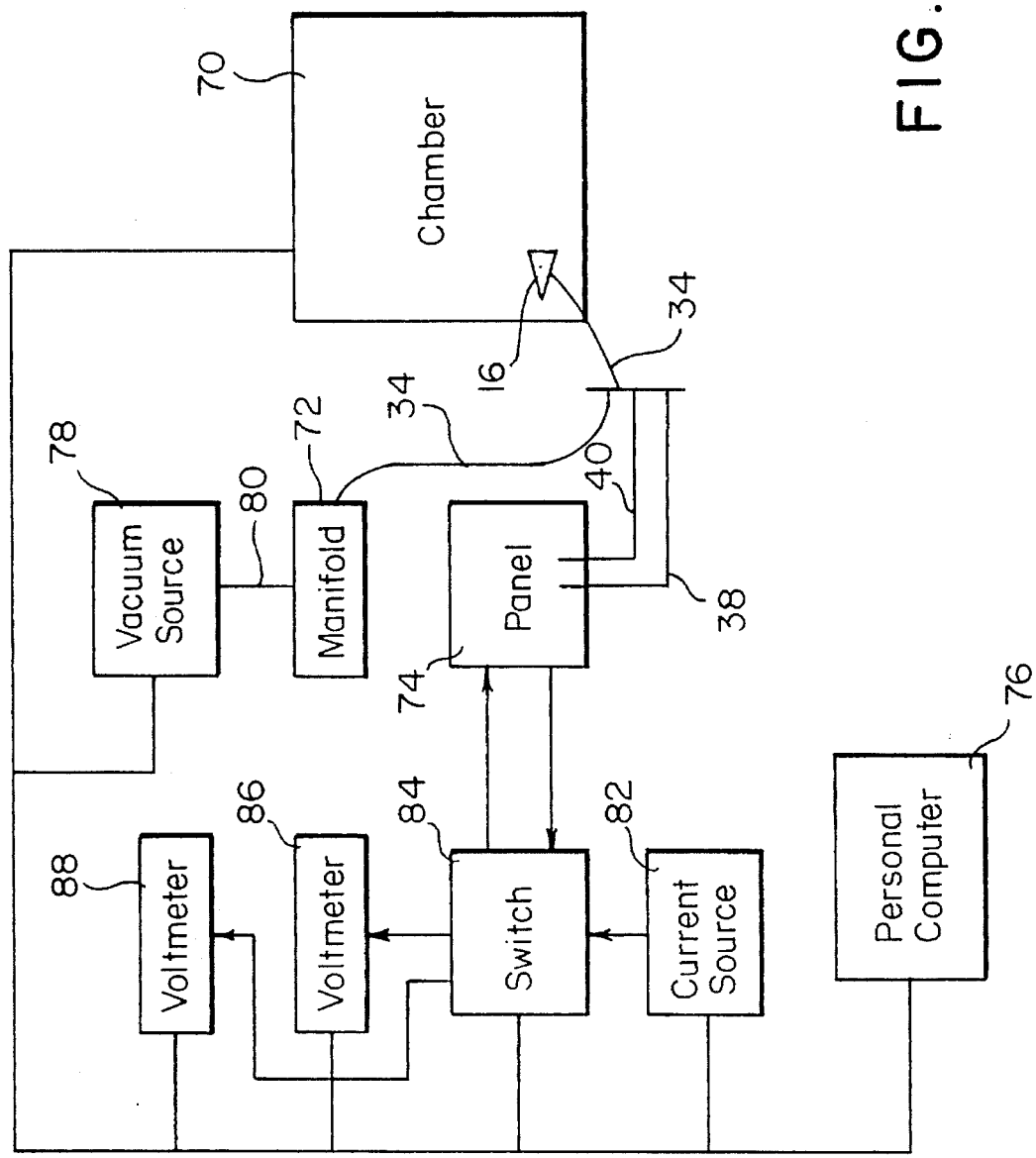
FIG. 7 is a block diagram of the compensation system of the invention for generating temperature coefficients for the pressure transducer.

Before use in the field, every sensor is pre-compensated in a controlled environment to determine the temperature/ pressure coefficients for temperature compensation of the pressure transducer. The apparatus used for temperature compensation is shown in FIG. 7.

The sensor 16 is secured in a controlled temperature chamber 70. A suitable chamber is a Tenney, Inc. model TJR. The reference pressure tube 34 is connected with a vacuum manifold 72 and the wire pairs 38, 40 are connected with an electrical panel 74. The manifold and panel enable a number of sensors to be compensated simultaneously under control of a personal computer 76. Vacuum applied to the reference pressure tube of the sensor simulates liquid level pressure applied to the opposite side of the pressure transducer within the sensor. A controlled vacuum source 78 such as a Druck model DPI 510 is connected with the manifold 72 via a line 80 to apply a vacuum to the sensor.

By changing the vacuum supplied to the sensor, various pressures can be simulated at the sensor. Furthermore, by changing the temperature in the chamber 70, different temperatures can be applied to the sensor. According to a preferred embodiment of the invention, at least five different pressures can be applied, each at five different temperatures for a total of twenty-five different test sets of pressure and temperature.

A current source 82 supplies a constant current to each sensor being compensated via a switch 84. Also connected with the switch are two voltmeters 86, 88. One of the voltmeters is connected to measure the voltage across the drive wires 38 and the other voltmeter is connected to measure the voltage across the drive wire 40, thereby to measure the drive and differential output voltages for each sensor, respectively. The switch 84 provides for selection of individual pressure transducers during the compensation operation where a plurality of transducers are compensated during the same operation.

At each pressure and temperature test set, the drive and output voltages of the pressure transducer are measured. The personal computer 76 records the pressure, temperature, drive voltage, and output voltage for each test set of the sensor. After the data has been gathered for all the test sets, the computer calculates the required compensation coefficients for each pressure transducer by regression analysis. The computer can also be programmed to perform certain quality assurance checks on the recorded data to verify proper operation of the compensation apparatus during operation and to check for certain statistical properties in the recorded data for statistical properties when the resulting data are operated on by equations employing the determined coefficients.

Using the aforementioned twenty-five test sets of data, a program performs a least mean squares error fit resulting in a number of temperature/pressure coefficients less than or equal to the number of data sets for the equations. The resulting coefficients are stored in the memory 64 of the data logger associated with the particular sensor or are recorded in lookup tables.

When the flowmeter is calibrated, the coefficients are employed to generate three lookup tables, one for each of the $A_x$ terms. These tables are stored in the EPROM 60. When a level estimate is calculated by the microprocessor based data logger 52 of the flowmeter, the measured value E is used to enter the tables and the three $A_x$ parameters are determined by interpolating between the two points enclosing the value of E. The three $A_x$ values are applied to the measured value of V by equation (1) resulting in a level estimation.

The method described above for applying the nine coefficients to obtain a level method is merely given by way of example. Other methods such as direct calculation may be applied. Also, this technique of computational pressure transducer temperature compensation of flowmeters may employ equations other than parabolic equations for either pressure or temperature behavior of the pressure transducer.

Application to the temperature compensation method of the invention results in level errors of approximately 0.25 inches over a temperature range of 5°–45° C. The fluid velocity sensor output is processed in the same manner as in prior art flowmeters. Typically, the flow errors associated with temperature changes of the liquid are reduced to ±6% from about ±45%.

While in accordance with the provisions of the patent statute the preferred forms and embodiments of the invention have been illustrated and described, it will be apparent to those of ordinary skill in the art that various changes and modifications may be made without deviating from the inventive concepts set forth above.

What is claimed is:

1. A method for measuring fluid flow in an open channel, comprising the steps of
   (a) actively compensating for temperature variation in a submersed fluid level pressure transducer by automatically correcting for fluctuations in fluid level as a function of fluid temperature, said compensating step including the steps of
      (1) operating the pressure transducer at a plurality of different combinations of pressure and temperature;
      (2) measuring drive and output voltages of the transducer at each pressure and temperature combinations, said output voltage comprising a differential voltage;
      (3) deriving a plurality of temperature/pressure coefficients from said measured voltages, the number of coefficients being no greater than the total number of pressure and temperature combinations; and
      (4) entering said coefficients into a data logger;
   (b) measuring the pressure of the fluid as a function of fluid level;
   (c) calculating the cross sectional area of the fluid in accordance with said pressure measurements and said temperature coefficients;
   (d) determining the velocity of the fluid; and
   (e) calculating the fluid flow as a function of the cross sectional area and the velocity of the fluid.

2. A method as defined in claim 1, wherein said coefficients are processed with a least mean squares fit prior to entry in the data logger.

3. A method as defined in claim 1, wherein said coefficients are used to create standardized compensation values which are stored in lookup tables within a memory of the data logger.

4. A method as defined in claim 1, wherein said drive voltage comprises an output from a temperature sensor.

5. A method as defined in claim 1, wherein said output voltage is produced from a bridge of the pressure transducer.

6. A method as defined in claim 1, wherein the fluid velocity is measured as a mean velocity of the fluid, the fluid flow being calculated as a function of the cross sectional area and mean velocity of the fluid.

7. A method as defined in claim 1, wherein the fluid velocity is estimated as a function of the fluid level.

8. A fluid flowmeter for measuring flow in an open channel, comprising
   (a) a submersed pressure transducer for measuring the pressure of a fluid as a function of fluid level;
   (b) means for actively compensating for temperature variations in said pressure transducer by automatically correcting for fluctuations in fluid level as a function of fluid temperature, said compensating means including
      (1) means for operating the pressure transducer at a plurality of different combinations of pressure and temperature;
      (2) means for measuring the drive and output voltages of the transducer at each combination of pressure and temperature, said output voltage comprising a differential voltage;
      (3) means for deriving a plurality of temperature/pressure coefficients from said voltages, the number of coefficients being no greater than the number of pressure and temperature combinations; and
      (4) means for storing said temperature coefficients;
   (c) means for calculating the cross sectional area of the fluid in accordance with said pressure measurements and said temperature coefficients;
   (d) means for determining the velocity of the fluid; and
   (e) means for calculating the fluid flow as a function of the cross sectional area and velocity of the fluid.

9. Apparatus as defined in claim 8, wherein said output voltage in produced from a bridge of the pressure transducer.

10. Apparatus as defined in claim 8, wherein said drive voltage comprises an output from a temperature sensor.

11. Apparatus as defined in claim 8, and further comprising a microcomputer for deriving said temperature coefficients and for calculating said cross sectional area of the fluid and fluid flow.

12. Apparatus as defined in claim 8, wherein said velocity determining means comprises a velocity sensor for measuring the mean velocity of the fluid, said calculating means calculating fluid flow as a function of the cross sectional area and mean velocity of the fluid.

13. Apparatus as defined in claim 8, wherein said velocity is estimated as a function of fluid level.

* * * * *